United States Patent
Weigel

(10) Patent No.: US 8,102,143 B2
(45) Date of Patent: Jan. 24, 2012

(54) ELECTRIC DRIVE UNIT

(75) Inventor: Jan Weigel, Großenbuch (DE)

(73) Assignee: Siemens Aktiengesellschaft, Munich (DE)

( * ) Notice: Subject to any disclaimer, the term of this patent is extended or adjusted under 35 U.S.C. 154(b) by 723 days.

(21) Appl. No.: 12/283,408

(22) Filed: Sep. 11, 2008

(65) Prior Publication Data

US 2009/0085505 A1    Apr. 2, 2009

(30) Foreign Application Priority Data

Sep. 28, 2007   (DE) .................. 10 2007 046 513

(51) Int. Cl.
*H02P 27/04*   (2006.01)
(52) U.S. Cl. .............. 318/801; 318/701; 318/400.32
(58) Field of Classification Search .......... 318/701, 318/727, 778, 400.01, 400.14, 721, 801, 318/400.32, 779, 799, 432; 322/10
See application file for complete search history.

(56) References Cited

U.S. PATENT DOCUMENTS

| | | | | |
|---|---|---|---|---|
| 5,747,971 A * | 5/1998 | Rozman et al. | ................ | 322/10 |
| 5,811,905 A * | 9/1998 | Tang | ................ | 310/179 |
| 5,880,550 A * | 3/1999 | Fukao et al. | ................ | 310/179 |
| 6,924,617 B2 | 8/2005 | Schulz et al. | | |
| 7,508,086 B2 * | 3/2009 | Huang et al. | ................ | 290/31 |
| 2002/0060547 A1 | 5/2002 | Jung | | |
| 2008/0303516 A1 | 12/2008 | Lamprecht | | |

FOREIGN PATENT DOCUMENTS

| | | |
|---|---|---|
| DE | 42 36 340 A1 | 5/1994 |
| DE | 10148517 A1 | 7/2002 |
| DE | 10 2005 024 203 A1 | 11/2006 |
| DE | 102006004166 A1 | 8/2007 |

\* cited by examiner

*Primary Examiner* — Walter Benson
*Assistant Examiner* — Anthony M Paul

(57) ABSTRACT

Electric drive units comprising a common active part having a stator and a rotor, which has windings and/or permanent magnets for a drive function and an energy transmission function, enable the rotor winding that is provided for energy transmission to be used to allow position detection at a low additional cost. For this purpose, a power converter in the rotor, which provides the output of electrical energy for the energy transmission function, impresses an alternating voltage into the rotor winding, said voltage being detected in the stator and allowing the rotor position to be determined.

9 Claims, 1 Drawing Sheet

ELECTRIC DRIVE UNIT

CROSS REFERENCE TO RELATED APPLICATIONS

This application claims priority of German application No. 10 2007 046 513.2 DE filed Sep. 28, 2007, which is incorporated by reference herein in its entirety.

FIELD OF INVENTION

The invention relates to an electric drive unit. Such a drive unit is constructed in particular according to the principle of a synchronous motor, an asynchronous motor or a synchronous reluctance motor and can be used as a linear or rotary drive.

BACKGROUND OF INVENTION

Electric drive units consist of a stator and a rotor that is moved in relation to the stator. In such motors, electrical power on the rotor is sometimes required, for example:
- to control the drive power by having a separate supply for the rotor, such as, for example, exciter power in an electrically excited synchronous motor or dual fed asynchronous motor.
- as auxiliary energy for loading and unloading in transport tasks, clamping of work pieces or tools, for sensor systems to detect temperature and position, for example, and for data transmission systems.

Energy transmission in a drive unit requires a suitable energy transmission system. Since the drive unit is designed, depending on the application, as a synchronous motor, an asynchronous motor or a reluctance motor, including specific sub-types, a number of parameters need to be considered in the design thereof. The energy transmission system has to be integrated into the working unit or attached separately. In the prior art, the power required is transmitted for example, by means of sliding contacts or trailing cables (where the path and angle for maneuver is restricted). The provision of a separate energy transmission system with a spatially separate active part is also known; in for example, the exciter in a synchronous motor, or linear inductive energy transmission systems. This principle is described in DE 42 36 340 A1, for example.

Problems inherent these known solutions to the problem are:
- additional space/weight required for the energy transmission system: in the case of trailing cables, the weight of trailing cables moved is even variable.
- wear, friction, contamination.

A procedure known from DE 10 2005 024 203 A1 consists of accommodating the drive function and energy transmission function in a common active part and ensuring by appropriate selection of the winding parameters that the drive function and the energy transmission function can to a large extent be operated independently.

SUMMARY OF INVENTION

An object underlying the invention is to provide an electric unit having a drive function and energy transmission function with an extended range of functions.

The object is achieved by an electric unit having the features of an independent claim. Developments are set out in the dependent claims.

An electric unit comprises the following units:
- a stator and a rotor;
- a drive system to drive the rotor;
- an energy transmission system to supply the rotor with electrical energy;
- an active part common to the drive system and the energy transmission system, in which windings and optionally permanent magnets for both systems are provided;
- at least one rotor winding and at least one stator winding in the active part; and
- a power converter for the output of electrical energy.

The power converter is designed to impress an alternating voltage for a position detection function onto the rotor winding and means are provided in the energy supply system for detection of the current component generated by the alternating voltage in the stator winding and determination of the position of the rotor from the current component is provided.

The unit has a rotary drive or alternatively a linear drive. The drive system for the drive unit is designed to be single phase or multiphase and drives the rotor by means of the interaction of the magnetic fields of the stator and rotor with the pole division that is as large as possible.

The stator and the rotor each have at least one winding, which is designed to be single- or multiphase. Furthermore, in certain embodiments of the machine, in addition to additional windings, permanent magnets can also be provided in the active part. The windings and optionally the permanent magnets for the drive or energy transmission in the unit are accommodated together in the common active part in the same grooves.

The energy transmission system ensures that electrical energy is available in the rotor, which serves to tension tools, or supply sensors or further drive axes, for example. The output of electrical energy is achieved via a power converter, preferably a self-commutated power converter. Such a power converter allows a voltage at the rotor end to be rectified at a high setting and for energy to be supplied back to the stator. At the same time, it can be used to impress an alternating voltage, preferably with a higher frequency, into the rotor winding.

The electric field resulting from the alternating voltage that has been impressed is discharged into the stator winding where it generates a corresponding current component. An alternating voltage impressed into the winding system which is fixed for the rotor induces a stator current, which allows the determination of the position of the rotor to be achieved in an observed manner.

For a stator winding with an open circuit at the stator end, the result is a typical resolver. If the stator currents are corrected at test frequency by the inverter at the stator end, then at test frequency, the stator winding acts like an open circuit winding. The outputs of the current regulator then show the induced voltages to be measured.

The alternating voltage usefully has a space vector layer which is fixed for the rotor in order to allow any clear determination of the position to be achieved. If an alternating voltage $u_d(t)$ is impressed into an axis that is to be defined in the rotor winding system, then the stator currents and stator flow connections have the relationship shown below. A, B, M, $L_1$ and $\sigma$ are unit-dependent constants or are dependent on the slowly varying rotor position $\beta_L$. It can be seen that, in stator-fixed co-ordinates, the voltage impressed at the rotor end represents an excitation modulated in a sin/cos-shaped manner.

$$U_d = U_2 \cdot \sin(\omega t)$$

$$\frac{d}{dt}\begin{pmatrix} i_\alpha \\ i_\beta \\ \Psi_\alpha \\ \Psi_\beta \end{pmatrix} = \underline{A}\left(\frac{d\beta_L}{dt}\right) \cdot \begin{pmatrix} i_\alpha \\ i_\beta \\ \Psi_\alpha \\ \Psi_\beta \end{pmatrix} + \frac{M \cdot \begin{pmatrix} -\cos(\beta_L) \\ -\sin(\beta_L) \\ 0 \\ 0 \end{pmatrix}}{\sigma L_1 L_2} \cdot U_2 \cdot \sin(\omega t) + \underline{B} \cdot \begin{pmatrix} u_\alpha \\ u_\beta \end{pmatrix}$$

The drive unit according to the invention, which has the aforementioned features, therefore comprises, in addition to the drive function and the energy transmission function, position detection for the rotor with virtually no additional expense. Such a position detection is basically desirable for position- or speed-regulated drives. A special and additional sensor, such as an incremental indicator for example, is not required.

Drives that have not only the drive function, but also deliver electric power to their rotor at the same time and achieve this without any further magnetic active part represent an advantageous solution in terms of saving costs, space and complexity when achieving the objectives of drive and energy transmission in a unit. Integrating position detection into such a unit without a special sensor having to be additionally inserted for this purpose further increases the reliability and robustness of the unit, since the design thereof is less complex or extends its range of functions.

The frequency of the alternating voltage is preferably as large as possible but selected in such a way that there is adequate coupling despite field displacement from the stator due to eddy currents.

In an advantageous embodiment and development of the invention, the drive unit is designed in such a way that the current component resulting from the impressed alternating voltage at the stator end is compensated for in that location by a further alternating voltage being impressed. Additional losses resulting from the position detection function are thus minimized.

In the case of a synchronous motor and sub-types thereof, a single stator winding can be assigned to both the drive system and the energy transmission system and be used by both of them. For this purpose, energy transmission takes place in a transformatory manner in the unit's d-axis, the axis of the rotor field. In addition, the test voltage for the position detection is impressed in the d-axis in the rotor winding.

The rotor can be designed as an electrically excited rotor or as a permanent magnet rotor with sunken or surface-mounted magnets. In the electrically excited rotor, the energy supply winding and the position detection winding are provided from the onset.

The following position detection, which relates to conventional sensor-free regulation, is a special case. A high-frequency voltage is impressed by the stator and the reaction in the current is measured and evaluated with respect to an anisotropy which is fixed for the rotor. A differing reluctance in various winding axes due to saturation effects or geometrical parameters represents magnetic anisotropy. In particular, synchronous motors excited by permanent magnets have a low degree of anisotropy due to a large effective magnetic air gap. If a cage winding is incorporated in the gaps between the poles of the surface permanent magnets, then due to the eddy current path in the cage winding, there is an apparently lower inductance in the field axis than in the lateral axis.

BRIEF DESCRIPTION OF THE DRAWINGS

Further details and advantages of the invention will emerge from the figure description of embodiments that follows, by means of the drawing in conjunction with the claims. The figures show in a schematic form:

DETAILED DESCRIPTION OF INVENTION

Figure 1:
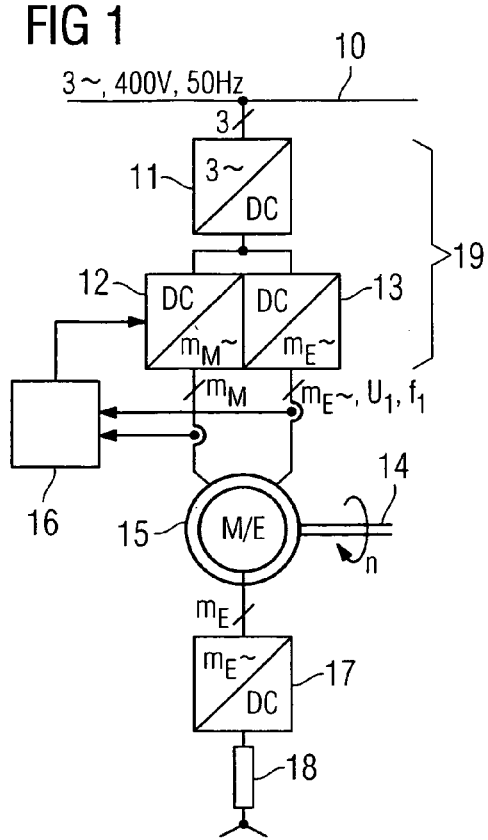
FIG. 1 a block diagram of an electric drive unit with inductive energy transmission and position detection, FIG. 2 a block diagram of a synchronous motor with a stator winding for drive function and energy transmission function, FIG. 3 the voltage output/input at the rotor end with a single-phase self-commutated power converter.
Figure 2:
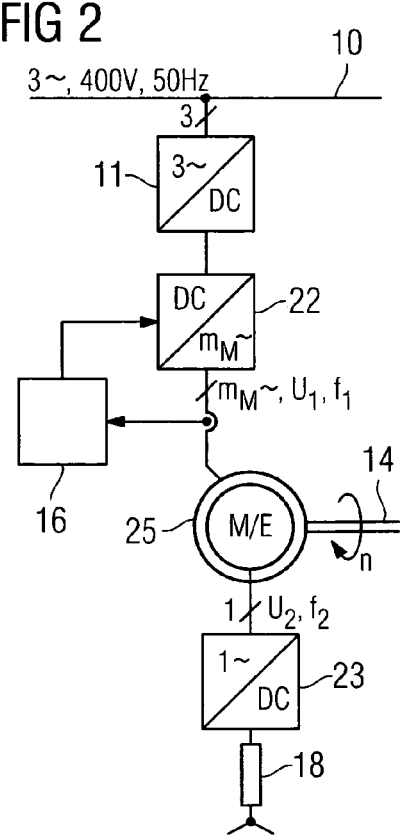

The main embodiments according to the invention will emerge from FIGS. 1 and 2. The further figures each show individual aspects for various embodiment possibilities.

FIG. 1 shows a drive unit 15 connected to a three-phase network 10, said unit containing a system for energy transmission. FIG. 1 further shows a power converter 19, which consists specifically of a rectifier 11 and two inverters 12 and 13 connected to the direct voltage intermediate circuit. The first inverter 12 is responsible for the motor's drive function and the second inverter 13 for the energy transmission function. Both inverters 12, 13 act on corresponding stator windings in the drive unit 15, the stator windings being accommodated in a common active part. The drive unit 15 further has a drive shaft 14, which rotates at the speed n. There is furthermore an electrical load 18 shown symbolically as an ohm resistor. The electrical load 18 is supplied with power via the energy transmission system, the electric power output being achieved via a self-commutated power converter 17. In this case, energy feedback from the load circuit to the stator is also possible. The mechanical load on the output shaft is not shown.

A servo-controller 16 provides the return output to the first inverter 12 and thus to the speed and/or position regulator. A position detection system that supplies input data for the servo-controller 16 is also provided. For this purpose, the servo-controller 16 is connected to the stator windings for the energy transmission function and the drive function. The stator windings function as a position indicator as well as providing the energy transmission. For this purpose an alternating voltage is impressed by the self-commutated power converter 17 into the rotor winding of the energy transmission system. The resulting field, which is constantly and firmly linked to the position of the rotor, inputs into the stator windings, such that a corresponding current component is generated in the stator. This current component is detected and evaluated by the servo-controller 16. This differs from the prior art in that no separate position detection system is required for this purpose.

A second embodiment possibility is shown as a block diagram in FIG. 2. The unit according to FIG. 2 is a synchronous motor 25. Unlike the unit shown in FIG. 1, this has only one stator winding, which is used for both the drive function and for the energy transmission function. In this case, therefore, only one rectifier 11 and one inverter 22 are required, whilst the second inverter at the stator end in FIG. 1 is unnecessary. The servo-controller 16 is connected to the stator winding and the inverter 22 and again detects the position and/or speed n of the rotor in a sensor-free manner and controls the inverter 22 in the manner of a regulated motor drive.

Figure 3:
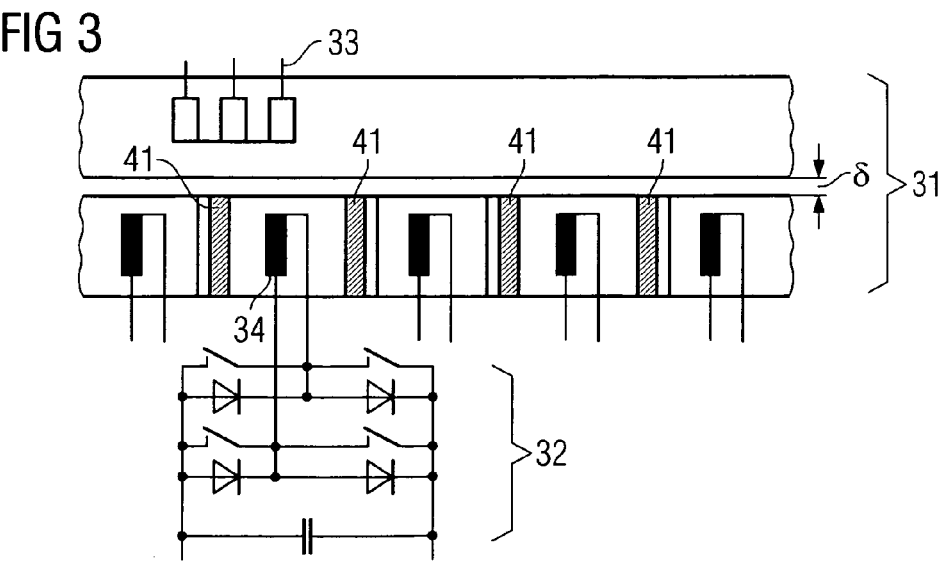

In both these cases, a single-phase self-commutated power converter 32 according to FIG. 3 is used for the output of energy in the energy transmission system, that is, for the energy supply to the load 18. FIG. 3 further shows the common active part 31 of the synchronous motor 25, wherein the active part 31 contains the three-phase stator winding 33 in the stator, the single-phase rotor winding 34 of the energy transmission system in the rotor and in this location the permanent magnets 41 for the rotor flux of the drive function in the rotor. The rotor flux could equally well be electrically generated by means of an exciter winding in the d-axis (i.e. by excitation). Said exciter winding then serves at the same time to provide the energy transmission and position detection, such that the latter two functions can be integrated into such a unit without further modifications. The rotor winding 34 is connected to the power converter 32. The rotor winding 34 serves in this case for both energy transmission and position detection, which is why the aforementioned alternating voltage is applied thereto.

In the example of a permanently excited unit, according to FIG. 3, for example, there is a relatively large air gap effective in the d-axis due to the reluctance of the permanent magnets 41, and as a result thereof, there is a relatively poor transformatory coupling between the stator and the rotor. Due to the greater selectable pole division of the energy transmission function, a better transformatory coupling can basically be achieved with a further energy transmission stator winding according to FIG. 1 than in the embodiment according to FIG. 2.

The invention claimed is:

1. An electric unit, comprising:
   a stator;
   a rotor, wherein the stator and the rotor form a drive system to drive the rotor and an energy transmission system to supply the rotor with electrical energy;
   a common active part for the drive system and the energy transmission system, wherein windings and optionally permanent magnets in the rotor are provided;
   at least one rotor winding and at least one stator winding in the active part;
   a power converter for the output of the electrical energy, wherein the power converter is designed to impress an alternating voltage for a position detection function onto the rotor winding, wherein a frequency of the alternating voltage of the position detection function is selected such that there is adequate coupling despite field displacement from the stator due to eddy currents; and
   a detection device in the energy supply system to detect a current component generated by the alternating voltage in the stator winding and for determination of the position of the rotor from the current component.

2. The electric unit as claimed in claim 1, wherein the current component resulting from the impressed alternating voltage at the stator end is compensated for by a further alternating voltage being impressed.

3. The electric unit as claimed in claim 1, wherein the electric unit is designed as a synchronous motor, wherein the stator only comprises the stator winding, which is further assigned to the drive system and the energy transmission system.

4. The electric unit as claimed in claim 1, wherein the stator has two stator windings, one of which is assigned to the energy transmission system and the other to the drive system.

5. The electric unit as claimed in claim 4, wherein the rotor has a pole division that is as large as possible.

6. The electric unit as claimed in claim 4, wherein the electric unit is an asynchronous motor.

7. The electric unit as claimed in claim 4, wherein the electric unit is a synchronous motor.

8. The electric unit as claimed in claim 7, wherein the synchronous motor is excited by permanent magnets, or excited electrically.

9. The electric unit as claimed in claim 4, wherein the electric unit is a synchronous reluctance machine.

\* \* \* \* \*